Figure 1:
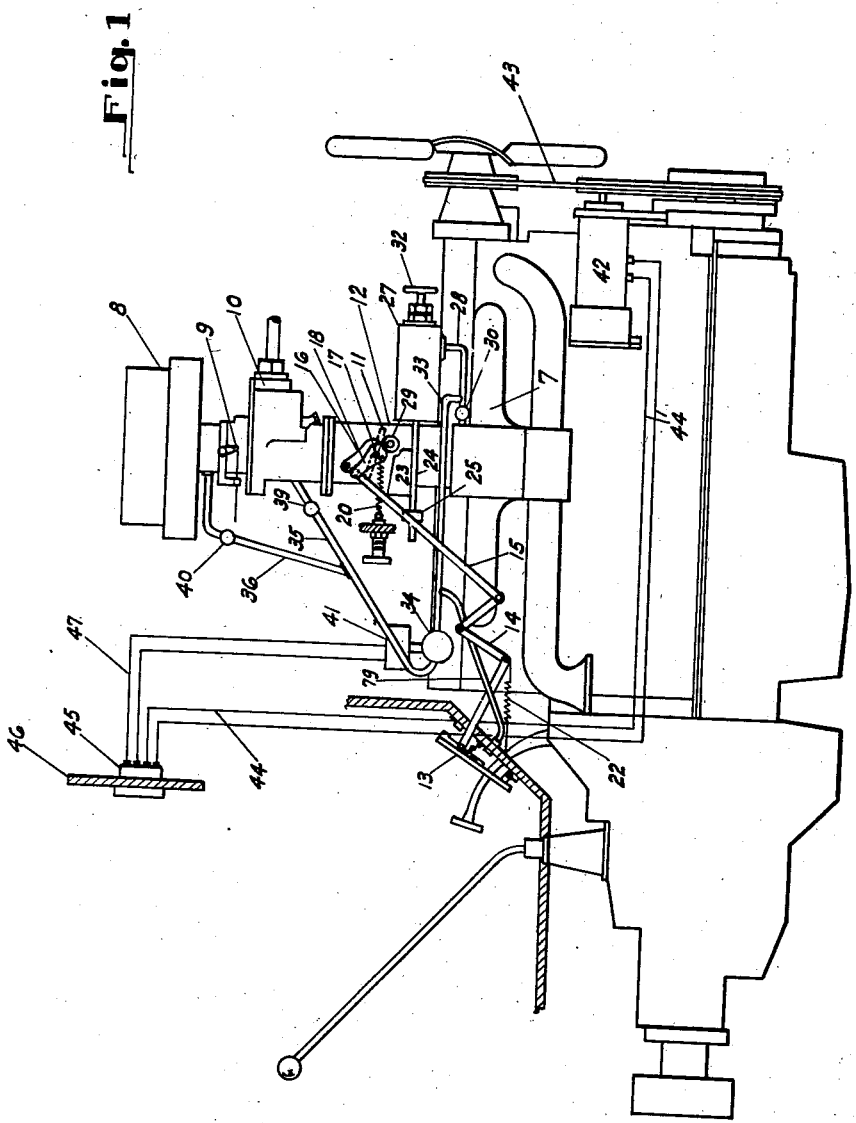

Dec. 10, 1940.    G. E. HOWARD    2,224,600
SPEED REGULATOR
Filed Sept. 23, 1939    3 Sheets-Sheet 1

INVENTOR
George E. Howard,
BY Archworth Martin,
ATTORNEY.

Dec. 10, 1940.   G. E. HOWARD   2,224,600
SPEED REGULATOR
Filed Sept. 23, 1939   3 Sheets-Sheet 2
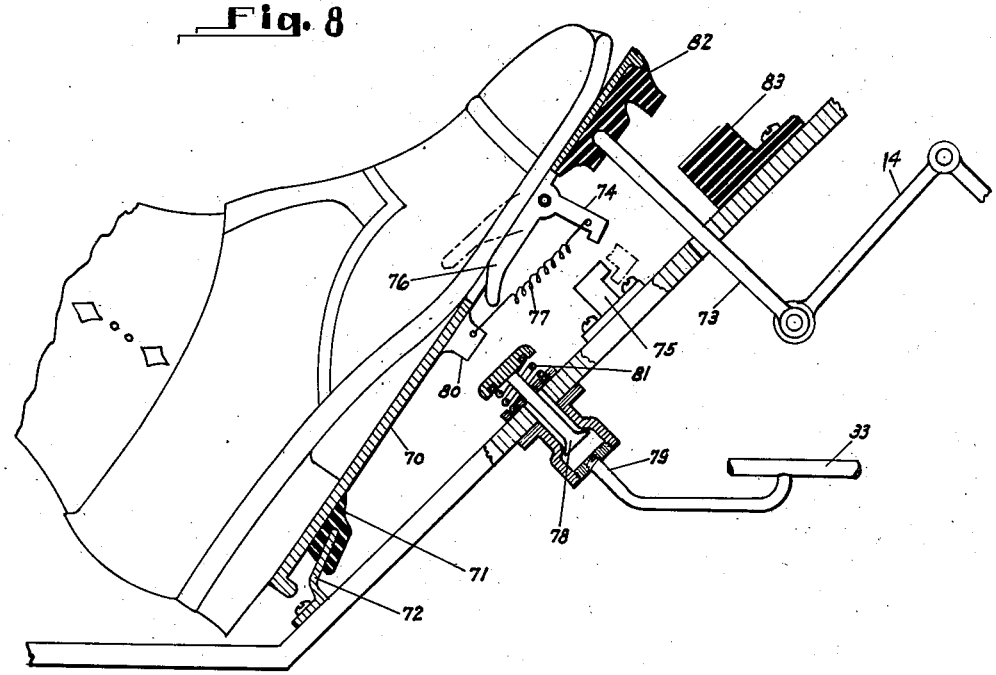
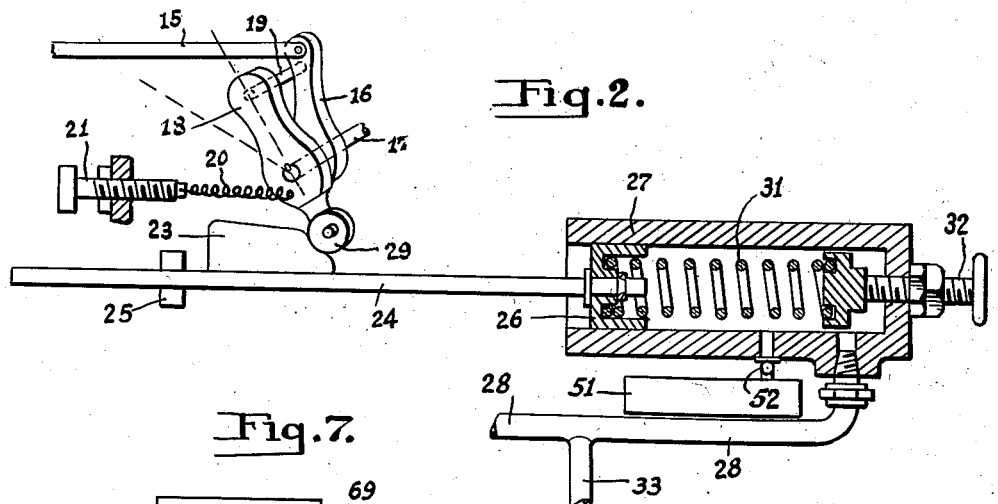
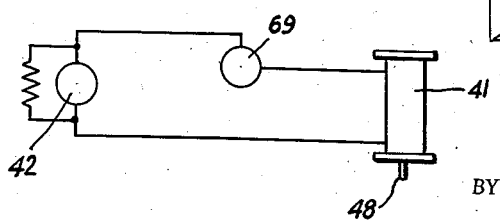
INVENTOR.
George E. Howard,
BY Archworth Martin,
ATTORNEY.

Dec. 10, 1940.   G. E. HOWARD   2,224,600
SPEED REGULATOR
Filed Sept. 23, 1939   3 Sheets-Sheet 3

INVENTOR.
George E. Howard,
BY Archworth Martin,
ATTORNEY.

Patented Dec. 10, 1940

2,224,600

REISSUED

UNITED STATES PATENT OFFICE 2,224,600

SPEED REGULATOR

George E. Howard, Butler, Pa.

Application September 23, 1939, Serial No. 296,241

22 Claims. (Cl. 123—103)

While my invention is hereinafter described in connection with its use on a motor vehicle driven by an internal combustion engine, it is useful also in controlling the speed of engines used otherwise than to drive vehicles.

One type of governing device commonly employed in controlling the speed of internal combustion engines utilizes the suction or reduced pressure in the intake manifold to operate a piston or the like, in one direction, against the tension of a spring; the piston in turn having connection with a throttle valve and moves the valve toward closed position when the suction reaches a predetermined degree. Another type commonly employed is a mechanically-driven speed governor which exerts a pull or force proportionate to engine speed, and has connection with the throttle valve to effect restriction of fuel flow to the engine when the speed exceeds a predetermined rate.

Neither of these types of governor is satisfactory. The suction-operated governor responds primarily to load, and it controls the speed only because there is a relation between speed and manifold pressures at various loads. This relation is subject to wide variation. It is different with every engine and every carburetor, and it varies in the same engine and same carburetor, with every make of gasoline and with the temperature of the incoming air and with barometric changes that are due either to change in elevation or change in weather conditions. To get even these approximate results, a cam has to be used whose contour is different for each engine and carburetor. These cams are designed for one speed, and any change in speed setting over or under the speed for which the cam is designed results in further variation that is often very pronounced. Suction governors ordinarily vary 20%, and frequently more, which is a condition that makes them entirely impractical.

Again, governors of the suction type are subject to "lag," because of the volume of air or fuel mixture in the intake manifold, which is of such volume relative to the size of the governor cylinder and piston as to function somewhat as a reservoir, so that too great a period of time is often required before the changes in pressure conditions in the intake manifold can become effective to operate the governor piston. In other words, "lag" is the phenomenon that represents the delay that occurs between the changes in the speed that are due to changes in load, and the change in position of the valve that controls the admission of fuel to the engine. The lag in operation of the governor piston frequently results in "swings" or overrunning movements of the piston and consequent movement of the throttle valve past the point it should occupy in order to supply fuel only in such quantity as will correct the change in speed and load.

As to the mechanically-actuated governors of the centrifugal or other types which act directly upon the throttle, there is frequently too sudden movement of the valve through movement of the governor under variation in engine speed, with the result that there is fluttering or jerky operation, which is hard on the machine and on the nerves of the driver.

Stable governors of the centrifugal type ordinarily require speed variations or range of speed of at least 10%; thus for a given governor setting the speed will be stabilized by the governor at say 45 miles per hour under full load, and will be stabilized at 50 miles per hour under no load.

In the case of centrifugal governors and suction-operated governors, both commonly are mechanically connected to the throttle valve by use of links or levers, and there is consequently a considerable amount of friction which will prevent free operation of the governor, and as the frictional resistance is not always the same, there will be irregular variation in accuracy in the operation of the governors.

One advantage of using governors on motor vehicles is that they supposedly will automatically maintains the vehicle at a certain speed, thus relieving the driver of nervous strain and exhaustion such as occurs when he endeavors to maintain the vehicle speed by constantly watching the speedometer and operating the throttle valve in accordance with changes in rate of speed. In the manual control of the vehicle over long distances, the operator also becomes tired through having to hold his foot constantly on the accelerator pedal.

While in the case of a vehicle having a speed governor and a hand throttle which may be set at an open position, the driver is relieved of nervous and physical exhaustion above referred to, he will not usually secure the best average vehicle speed. For example, if the legal speed limit is 50 miles per hour, it will usually happen, with governors of the types above referred to, that the driver will find he has averages considerably less than 50 miles per hour, because of the fixed or irregular variations in governor operation. If he should set the governor at such a point as to insure an average speed of 50 miles per hour, there would be many times when the vehicle would be travelling too far above the legal limit, which, while it would compensate for periods of lower speed, would be objectionable. It would run 52½ miles per hour or over at light loads and render the operator liable for law infraction.

It is one purpose of my invention to provide a governor of such accuracy that it will maintain the vehicle speed at approximately the legal limit, without substantial variations above or below such limit, and with consequent greater mileage per hour, and of course without nervous and physical strain on the driver.

Another object of my invention is to provide governing apparatus wherein the two types of governors referred to are combined to operate cooperatively, in such manner that there is a greater accuracy of control than is possible with a suction-operated governor, and wherein the rhythmic or fluttering action incident to the use of mechanically-actuated governors alone is avoided.

Another object of my invention is to provide a governing apparatus of such form that change of a predetermined degree of engine speed will render the suctional force in the intake manifold instantly effective to move the throttle valve, even though there has been no substantial change in pressure within the manifold.

A further object of my invention is to provide governing apparatus of such form wherein there is no substantial interference with governing operation, through frictional resistance.

Still another object of my invention is to provide means whereby the governor can quickly be rendered inoperative to limit vehicle speeds, as when a quick burst of speed is required by the vehicle operator in order to avoid an accident.

Briefly stated, my invention comprises a main speed control element that is actuated through changes in pressure at the intake manifold, and the varying of the effectiveness of such governing device by the use of a supplemental governing device which is directly responsive to changes in engine speed.

Referring further to the matter of maintaining high average speed without exceeding legal speed limits, about the best that can be done through purely manual control of the throttle valve is within about 2% variation from the desired average speed, and to maintain such speed within the 2% variation referred to requires constant attention by the operator to the speedometer and throttle pedal, which is, of course, nerve-racking and tiresome. By the use of my invention an average speed can automatically be maintained with considerably less than a 2% variation.

Figure 3:
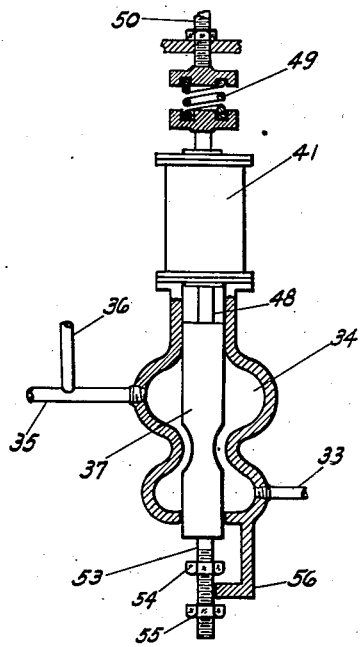
Figure 4:
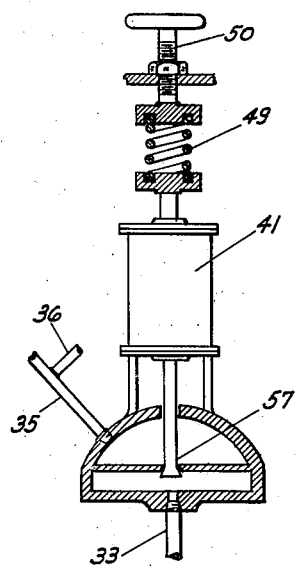
Figure 5:
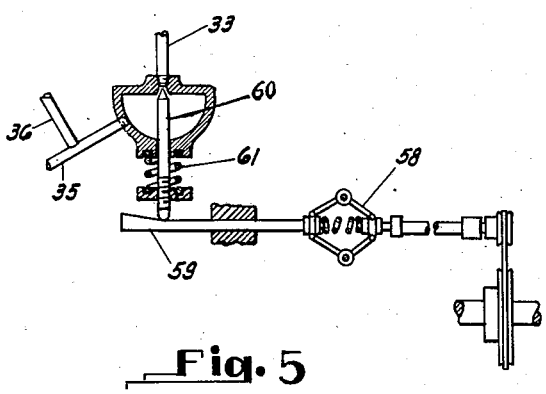
Figure 6:
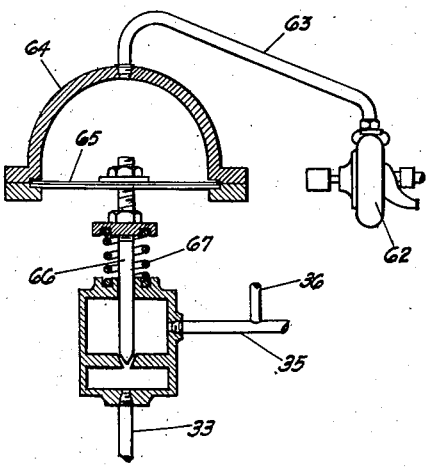

Some of the forms which my invention may take are shown in the accompanying drawings wherein Figure 1 is a side view of an automobile engine equipped with my invention; Fig. 2 is an enlarged view of a portion of the structure of Fig. 1, partly in section; Fig. 3 is a sectional view, on an enlarged scale, of a portion of the electrically-operated control apparatus of Fig. 1; Fig. 4 shows a modified form of the structure of Fig. 3; Fig. 5 shows a control device of the centrifugal governor type employed with my apparatus; Fig. 6 shows a control device responsive to pressure from the water pump or the oil pump of a motor vehicle; Fig. 7 is a diagrammatic view showing a modified form of electrical apparatus for controlling the admission of air to the governor cylinder of Figs. 1 and 2, and Fig. 8 is a view showing a throttle-operating pedal of such form that it can be latched at its depressed position, and which can also be utilized to render the suction-operated governing device ineffective.

As shown in Figure 1, the apparatus includes various conventional parts such as an air cleaner 8; a choke valve 9; a carburetor 10; a throttle valve 11 and a fuel inlet passageway 12 leading to the intake manifold 7. A foot pedal 13, which may be of conventional form or constructed as shown in Fig. 8, has link connection with a bell crank 14, that is in turn connnected to a link 15 that has connection with a rocker arm 16 which is loosely mounted on a shaft 17, that carries the throttle valve 11, as shown more clearly in Fig. 2. It will be seen that when the foot pedal 13 is depressed, the link 15 will be thrust upwardly to rock the arm 16 in a clockwise direction upon the shaft 17. A crank arm 18 is keyed to the shaft 17 and carries a pin or stud 19 that lies behind the rocker arm 16, as shown in Fig. 2. A tension spring 20 has connection with the crank arm 18 and is an anchored to an adjusting screw 21, whereby the tension of the spring 20 can be adjusted. When the arm 16 is moved away from the stud 19, through depression of the foot pedal, against the tensional force of a spring 22, the spring 20 will rock the shaft 17 to move the throttle valve 11 to open position.

In order to control the extent of throttle opening under the tension of the spring 20, I provide a cam block 23 which is mounted on a bar 24, one end of which is supported by a guide block 25 and the other end of which has connection with a piston 26 that is contained within a cylinder 27. A pipe 28, provided with a hand valve 30, leads from the cylinder 27 to the intake line 12 at a point between the throttle and the engine, so that upon a predetermined reduction in pressure within the manifold 7, the piston 26 will be subjected to suctional force that tends to move it toward the right, and hence to bring the cam block 23 into engagement with a roller 29 that is carried by the lower end of the crank arm 18, so that if said suction exceeds a predetermined degree, as when the engine is running at a speed which is too high, the block 23 will be drawn to the right, causing the shaft 17 and the throttle valve 11 to be rocked toward closed position, in a counterclockwise direction. The movement of the piston 26 is against the compression of a spring 31, the resistance of which is adjusted by means of a screw 32.

It will be seen that the cam block 23 is quite steeply inclined at that end which initially engages the crank roller 29 and for the remainder of its length is less sharply inclined. The cam block is constructed in this manner so as to impart a wider angular movement to the valve 11, for a given distance of piston travel, when the valve is at approximately its wide open position, than when the valve is adjacent to its closed position. In other words, it is desired that for a given distance of piston movement, the throttling effect of the valve 11 will be of a given degree, whether the valve is near its open position or near its closed position when being actuated by the control piston.

Since, as above explained, the suctional force in the intake manifold is not always the same at a given engine speed, because of variations in suctional force at said speed, under load changes, I provide means for modifying the effectiveness of the suctional force within the cylinder 27, and to this end provide means actuated directly in relation to engine speed, for admitting air into the suction line 28, so that the suctional force therein will be reduced when the actual engine speed is not too high, and so that there will be an increase of suctional force in the cylinder 27 when the engine speed exceeds a predetermined rate.

To this end I provide a pipe 33 that communicates with the pipe 28 and with a valve chamber 34. The valve chamber 34 in turn communicates through a pipe 35 with the intake line, at a point between the carburetor and the throttle valve, and through a pipe 36 with the atmosphere or at a point in advance of the choke valve 9. A valve 37 (Fig. 3) is provided within the valve chamber 34 to control flow of air through the pipe 33 to the pipe 28. It will be seen that when the valve 37 is in its lowered position, air will flow from the pipe 35 or the pipe 36, or both, to the pipe 33, and being more nearly at atmospheric pressure than the air within the pipe 28, will cause a reduction in suctional force on the piston 36. The lines 35 and 36 are controlled by hand valves 39 and 40 respectively, so that a mixture of fuel and air can be drawn from below the carburetor or outside air drawn from above the throttle valve.

The valve 37 is operated by a solenoid 41 which is energized by a generator 42. The generator 42 is driven by the fan belt 43 or some other moving part of the engine, and may suitably be of the shunt wound type or some other type which will generate voltage in accordance with the engine speed, and hence energize the solenoid 41 to a degree dependent upon the rate of engine speed.

The generator 42 is connected through conductors 44 with an adjustable rheostat 45 mounted on the instrument panel 46 of the vehicle. Wires 47 lead from the rheostat to the solenoid 41. The effectiveness of the solenoid can therefore be controlled by manual manipulation of the rheostat. Alternately, the rheostat could also be placed in series with the field of the generator to vary the effectiveness of the solenoid at certain engine speeds.

The rheostat can effectively be used for quickly and accurately making speed settings, as for example, going from a jurisdiction where the speed limit is 45 miles per hour to one wherein the speed limit is 50 miles per hour. This is accomplished without affecting the working of any other part of the apparatus.

The core 48 of the solenoid is connected with the valve 37 and when the solenoid is energized to a predetermined degree, as when the engine speed attains a certain rate, the valve 37 will be drawn upwardly against the compressive force of a spring 49, the tension of which is adjustable by a screw-threaded member 50. This upward closing movement of the valve 37 at the higher engine speeds has the effect of closing off communication through the pipe 33 to the pipe 28, and therefore renders the suctional force within the pipe 28 more effective to move the throttle valve 11 toward its closed position. The extent to which the valve 37 is closed will depend upon the rate of engine speed, and it will be seen that at normal speeds, with the valve 37 in partly open position, the suctional force within the intake manifold may not be sufficient to move the piston, but if the engine speed exceeds a predetermined rate, with said suctional condition existing in the cylinder 27, the valve 37 will be moved toward closed position, thus increasing the effectiveness of the suctional force and causing movement of the throttle valve toward closed position, thereby limiting the engine speed.

In order to counteract or overcome any tendency of the piston 26 to move too quickly upon changes in engine speed, as for example when there is a change in road grade for a very short distance, I provide means for delaying such movement. Said means comprises a reservoir 51 that has connection past a valve 52 with the cylinder 27. The suction within the intake manifold, when the engine is running, is usually sufficient to operate the piston 26, if the valve 37 is closed. Therefore, when the valve 37 is closed through increase in engine speed, to cut off flow through the line 33, there will be a tendency for the piston 26 to respond instantly to the suctional force. Quick response is not necessary or desirable where there is only momentary change in engine speed. If the operator finds that there is tendency for too quick responsive movement by the piston 26, he will open the valve 52 so that some of the suctional force will be temporarily dissipated or reduced by movement of air from the reservoir into the cylinder.

Means are provided for adjustably limiting the length of stroke or movement of the valve 37, so that it can be prevented from closing completely and can also be prevented from opening too far. To this end I provide a threaded extension 53 on the valve and nuts 54 and 55 thereon, that cooperate with a stop member 56 which is carried by the valve chamber. The nut 54 serves to limit downward or opening movement of the valve, and the nut 55 serves to limit closing movement thereof.

An important advantage resulting from the valve arrangement shown in Fig. 3 is that there is no considerable amount of friction, since the valve 37 is loosely mounted in its valve chamber and the small amount of clearance provided between the sides of the valve and the adjacent surfaces of the valve chamber, while preventing appreciable friction, will not permit leakage of sufficient air to interfere with the proper operation of the governor piston 26.

It will also be seen that since there is no mechanical connection between the core of the solenoid 41, which is responsive to changes in engine speed, and the throttle valve, there will be no appreciable frictional resistance to the operation of this speed responsive device, such as would be present in the case of a centrifugal governor directly connected to the throttle valve.

Hence the effectiveness of the speed responsive device will always be the same, at any given speed, regardless of changes in degree of friction between the members that have mechanical connection with the valve. While there is, of course, some friction as between the valve-moving parts shown in Fig. 2, the suctional force available at the intake manifold is ample to effect proper movement of the throttle valve when the speed governor reduces or shuts off the admission of air through the pipe 33 to the cylinder 27.

Referring now to Fig. 4, I show a structure that is similar to that in Fig. 3, in that the solenoid 41 and its associated parts are the same, except that a different form of valve 57 is employed, said valve being moved toward closed position under increase in engine speed as is the valve 37.

In Fig. 5 I show a centrifugal governor 58, which may be driven from any suitable part of the engine, as for example, the crank shaft or a pump shaft. In this arrangement, increase in engine speed will cause expansion of the governor 58 and movement of a camming bar 59 toward the right, thus moving a valve 60 toward its closed position, against the resistance of a spring 61.

In Fig. 6 I show valve-actuating means that is operated through fluid pressure from the water pump or the oil pump 62 of the engine, thereby creating fluid pressure within a line 63 into accordance with engine speeds. The pipe 63 leads into a chamber 64, the lower side of which is closed by a diaphragm 65. The diaphragm 65 is connected with a valve stem 66. The valve is normally held in its open position by a spring 67, but when the pressure in the chamber 64 increases, the valve will be moved downwardly by the diaphragm towards closed position, so as to restrict or cut off flow through the pipe 33 to the suction pipe 28.

My invention has still another advantageous feature, in that fuel mixture can be by-passed around the throttle valve to the intake manifold when the valve is closed, and the rate of flow of such by-passed fuel will be controlled by engine speeds. To this end the valve 40 will be closed, whereupon the fuel mixture will flow through the pipe 35, through valve chamber 34 and through pipes 33 and 28 to the intake manifold of the engine. The advantage of this feature is that if air is admitted to control the suction in the cylinder 27, this outside air will slightly change the ratio of air and gas mixture, whereas admission of the fuel mixture between the carburetor and the throttle will just as effectively operate the device while keeping the explosive mixture constant.

In Fig. 7 I show another arrangement for effecting energization of the solenoid 41 from the generator 42. In this arrangement the solenoid will not be energized except when the engine and the generator attain a predetermined speed and the voltage therefore reaches a certain value. A relay 69 of the electronic tube type is connected in the circuit, and as is well known in the art, the relay will prevent current from flowing in the circuit until the voltage has reached a certain value. Other current control devices such as what are known as high pass filters could obviously be substituted for the electronic relay when it is desired that the solenoid be energized only when the engine attains governing speed.

Referring now to Fig. 8, I show a novel arrangement of foot pedal control for the throttle valve and for the governor. The pedal 70 has at its lower end a hinge connection with the floorboard of the vehicle, the connection being effected through a rubber block 71 that is carried by the pedal plate and a metal prong or tongue 72 that is secured to the floorboard, the rubber 71 yielding sufficiently to permit pivot-like movements of the pedal. Near its upper end the pedal engages a link or strut 73 that has pivotal connection with the bell crank lever 14, the bell crank lever in turn having operative connection with the throttle valve as heretofore explained. A latch lever 74 of bell crank form is pivotally connected to the pedal 70 and has one of its arms hooked for engagement with a keeper 75 that is secured to the floorboard of the vehicle, when the pedal is depressed sufficiently far and the operator's foot removed from the arm 76 of the latch lever. A spring 77 yieldably holds the latch lever in hooked engagement with the keeper 75, a slot being provided in the pedal plate 70 to permit movement of the arm 76 to the dash line position.

This arrangement permits the pedal to be latched down in driving position, with the arm 16 moved away from the pin 19 so that the spring 20 can hold the valve in its open position. The speed of the car will automatically be controlled by the governing apparatus heretofore described. In order to stop the car, the driver need only press his foot upon the arm 76 of the latch lever, to disengage the lever, and permit the pedal to be raised by the spring 22 (Fig. 1).

It will sometimes be desirable that the driver should be able to impart a short burst of speed to the vehicle, in excess of that normally permitted by the governor, as when he is already driving at approximately the legal limit and it becomes necessary to accelerate the car movement in order to avoid a collision. To this end I provide means actuated by the pedal 70 for rendering the governor ineffective. This means comprises a valve 78 that admits atmospheric air through a pipe 79 to the pipe 33 and thence to the pipe 28, in sufficient quantity to neutralize or render less effective any suction in the pipe 28. The valve 78 is operated by a knob 80 on the under side of the pedal, to open the valve against the resistance of a spring 81, when the pedal is depressed below its normal driving position. The pedal is yieldably restrained against movement below its normal driving position, by engagement of a rubber knob-like projection 82 on the under side of the pedal, with a rubber block 83 that is mounted on the floorboard. Ordinarily the operator will move the pedal down only until he knows that the rubber 82 has engaged the member 83 and will not exert the additional pressure necessary to move the pedal still further. However, when necessity arises, he will depress the pedal hard enough to compress the rubber members 82 and 83 sufficiently to permit the boss 80 to push the valve 78 to its open position, and maintain the pedal in such position until the need for excess speed has passed.

As heretofore stated, I am able to automatically effect stabilization of governor control at a predetermined desired engine speed, with a variation of less than 2% from the speed for which the governing apparatus is set. For example, when the engine is driving the generator 42 of Fig. 7 at speeds which render it effective to energize the solenoid 41, the degree of energization of the solenoid will be exactly in accordance with or in proportion to engine speeds, since there is no mechanical friction, and such variations in current flow as result from the use of the electronic relay 69 or a high pass filter are inconsequential. As heretofore explained, there is no appreciable friction in the operation of the valve 37, and this is true also of the valve 57.

I claim as my invention:

1. The method of operating an internal combustion engine, which comprises controlling the rate of fuel supply through changes of load conditions as manifested by changes in pressure in the fuel supply line, and automatically changing the degree of control forces exerted by said pressure, in accordance with changes in engine speed.

2. The method of operating an internal combustion engine, which comprises controlling the flow of motive fluid to the engine through the use of suctional forces created in the fuel supply line, and automatically changing the said suctional forces in accordance with changes in engine speed, within a range which does not vary more than 2% from a predetermined engine speed.

3. The combination with an engine having an intake passageway provided with a throttle valve for controlling the flow of motive fluid to the engine, of means actuated through changes of pressure in the passageway, for imparting movements to the said valve, and means responsive only to changes in engine speed, for varying the force exerted by the manifold pressures upon said pressure-actuated means.

4. The combination with an engine having an intake passageway provided with a throttle valve for controlling the flow of motive fluid to the engine, of means actuated through changes of pressure in the passageway, for imparting movements to the said valve, and means responsive to changes in engine speed and movable independently of the valve-moving means for varying the force of the pressures upon the pressure-actuated means.

5. The combination with an engine having an intake passageway provided with a throttle valve for controlling the flow of motive fluid to the engine, of means actuated through changes of pressure in the passageway, for imparting movements to the said valve, and means responsive to changes in engine speed for varying the force of the pressures upon the pressure-actuated means, to a degree proportional to variations in engine speed.

6. The combination with an engine having an intake passageway provided with a throttle valve for controlling the flow of motive fluid to the engine, of a device actuated by suction from a point in said passageway between the valve and the engine and having operative connection with said valve, and means responsive to changes in engine speed, for changing the degree of suctional force exerted on said device.

7. The combination with an engine having an intake passageway provided with a throttle valve for controlling the flow of motive fluid to the engine, of a device actuated by suction from a point in said passageway between the valve and the engine and having operative connection with said valve, and means responsive to changes in engine speed, and movable independently of the throttle valve, for changing the degree of suctional force exerted on said device.

8. The combination with an engine having an intake passageway provided with a throttle valve for controlling the flow of motive fluid to the engine, of a piston having operative connection with said valve, a cylinder for said piston, a suction pipe leading from a point in the passageway between the valve and the engine to said cylinder, and means responsive to changes in engine speed for admitting air to the suction pipe, to vary the degree of suctional force on the piston.

9. The combination with an engine having an intake passageway provided with a carburetor and with a throttle valve between the carburetor and the engine, of a piston having operative connection with said valve, a cylinder for the piston, a suction pipe leading from a point in the passageway between the valve and the engine to said cylinder, a pipe leading from the passageway at a point between the valve and the carburetor to the suction pipe, and means responsive to changes in engine speed, for controlling flow through the second-named pipe to the suction pipe.

10. The combination with an engine having an intake passageway provided with a throttle valve for controlling the flow of motive fluid to the engine, of a manually-operated element operative upon said valve only in the direction to close the same, a spring urging said valve to open position, means actuated through changes of pressure in the passageway, for imparting closing movement to the valve in opposition to said spring, and means responsive to changes in engine speed, for varying the degree of pressure exerted upon the pressure-actuated means.

11. The combination with an engine having an intake passageway provided with a throttle valve for controlling the flow of motive fluid to the engine, of a manually-operated means operative upon said valve only in the direction to close the same, a spring urging said valve to open position, a piston or the like actuated through changes of pressure in the passageway, a valve-moving member operated by said piston, to move the valve toward closed position in opposition to the spring tension, means on said member for moving the valve through a greater distance when the valve is adjacent to its wide-open position than when the valve is at a more nearly closed position, for a given distance of piston travel, and means responsive to changes in engine speed, for varying the effectiveness of the said pressure upon the piston.

12. The combination with an engine having an intake passageway provided with a throttle valve for controlling the flow of motive fluid to the engine, of a device actuated by suction from a point in said passageway between the valve and the engine and having operative connection with said valve, a manually-operable element for moving the throttle valve, and means actuated by said element when it is moved to a predetermined position, for rendering said suction device inoperative.

13. The combination with an engine having an intake passageway provided with a throttle valve for controlling the flow of motive fluid to the engine, of a manually-operated element operative upon said valve only in the direction to close the same, a spring urging said valve to open position, means actuated through changes of pressure in the passageway, for imparting closing movement to the valve in opposition to said spring, means yieldably limiting movement of said element past the position at which it will permit the said spring to open the valve, and means actuated by said element when it is moved in opposition to said yieldable means, for rendering said suction device inoperative.

14. The combination with an engine having an intake passageway provided with a throttle valve for controlling the flow of motive fluid to the engine, of a piston having operative connection with said valve, a cylinder for said piston, a suction pipe leading from a point in the passageway between the valve and the engine to said cylinder, a valve for admitting air to the suction pipe to vary the effectiveness of the suctional force on the piston, a solenoid for actuating said valve, and an electrical generator driven by the engine, for energizing the solenoid to a degree determined by engine speed.

15. The combination with an engine having an intake passageway provided with a throttle valve for controlling the flow of motive fluid to the engine, of a piston having operative connection with said valve, a cylinder for said piston, a suction pipe leading from a point in the passageway between the valve and the engine to said cylinder, a valve for admitting air to the suction pipe to vary the effectiveness of the suctional force on the piston, and an electrical device driven by the engine, for actuating the last-named valve, when the engine speed exceeds a predetermined rate.

16. The combination with an engine having an intake passageway provided with a throttle valve for controlling the flow of motive fluid to the engine, of a piston having operative connection with said valve, a cylinder for said piston, a suction pipe leading from a point in the passageway between the valve and the engine to said cylinder, a valve for admitting air to the suction pipe to vary the effectiveness of the suctional force on the piston, and an electrical device driven by the engine, for actuating the last-named valve, to an extent determined by variations in engine speed within a predetermined speed range.

17. The combination with an engine having an intake passageway provided with a carburetor and with a throttle valve between the carburetor and the engine, of a fluid-conducting line leading from the said passageway at a point between the carburetor and the throttle valve, to a point in said passageway between the valve and the engine, means operated through changes in pressure in said passageway, for controlling the throttle valve, and a valve actuated upon predetermined changes in the rate of engine speed, for controlling the flow of fuel mixture through said line.

18. The combination with an engine having an intake passageway provided with a throttle valve for controlling the flow of motive fluid to the engine, of a device actuated by suction from a point in said passageway between the valve and the engine and having operative connection with said valve, a device movable in response to changes in engine speed, for changing the suctional force on said device, to a degree proportional to variations in engine speed, and means for adjustably limiting the range of movement of the last-named device.

19. The combination with an engine having an intake passageway provided with a throttle valve for controlling the flow of motive fluid to the engine, of a piston having operative connection with said valve, a cylinder for said piston, a suction pipe leading from a point in the passageway between the valve and the engine to said cylinder, a valve for admitting air to the suction pipe to vary the effectiveness of the suctional force on the piston, an electrical device driven by the engine, for actuating the last-named valve when the engine speed reaches a predetermined rate, and means for adjustably controlling the effectiveness of said device at various engine speeds.

20. The combination with an engine having an intake passageway provided with a throttle valve for controlling the flow of motive fluid to the engine, of means responsive to suction changes in the passageway, for imparting movements to the valve, a speed device actuated only by changes in engine speed, and a member operated by the speed device, for modifying the degrees of force exerted through said suction changes.

21. The combination with an engine having an intake passageway provided with a throttle valve for controlling flow of motive fluid to the engine and with a governing device which is automatically effective in a predetermined range of engine speed, for controlling flow of the motive fluid to the engine, of a manually-operable element for moving the throttle valve, the element being movable from a position at which the valve is approximately closed, to a position past that at which it admits flow of fuel sufficient for full engine power, and means actuated by said element when moved to the last-named position, for rendering the governing device inoperative.

22. The combination with an engine having an intake passageway provided with a throttle valve for controlling the flow of motive fluid to the engine, of a device actuated by suction from a point in said passageway between the valve and the engine and having operative connection with said valve, a manually-operable element for moving the throttle valve from a position at which the valve is approximately closed, to a position past that at which it admits flow of fuel sufficient for full engine power, and means actuated by said element when moved to the last-named position, for rendering said suction device inoperative.

GEORGE E. HOWARD.